Figure 3:
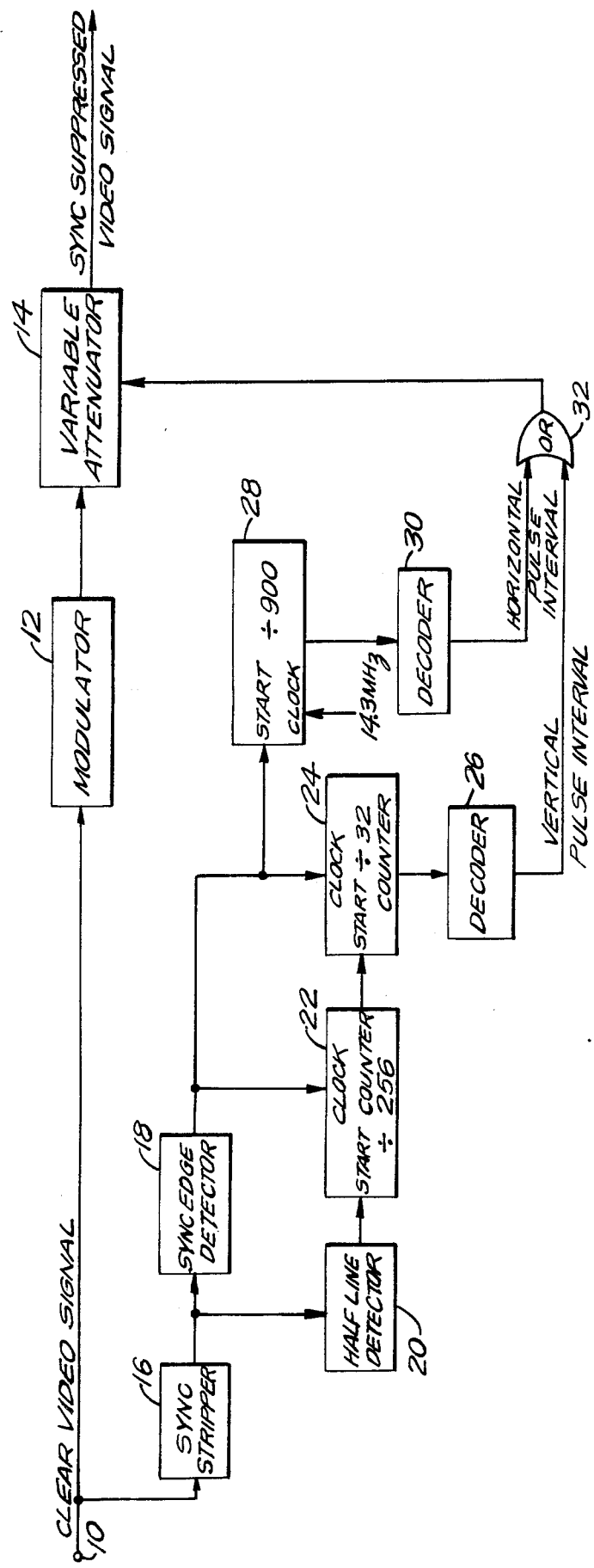

United States Patent [19]

Robbins et al.

[11] Patent Number: 4,571,615
[45] Date of Patent: Feb. 18, 1986

[54] TIMING GENERATOR FOR SYNC SUPPRESSED TELEVISION SIGNALS

[75] Inventors: Clyde Robbins, Fort Washington; Luis Morenilla, Warminster, both of Pa.

[73] Assignee: General Instrument Corporation, New York, N.Y.

[21] Appl. No.: 502,933

[22] Filed: Jun. 10, 1983

[51] Int. Cl.[4] .............................................. H04N 7/167
[52] U.S. Cl. .................................... 358/120; 358/123
[58] Field of Search ........................ 358/120, 122, 123

[56] References Cited

U.S. PATENT DOCUMENTS 4,390,898 6/1983 Bond et al. .......................... 358/123
4,396,946 8/1983 Bond .................................... 358/120

Primary Examiner—S. C. Buczinski
Assistant Examiner—Linda J. Wallace
Attorney, Agent, or Firm—Hopgood, Calimafde, Kalil, Blaustein & Judlowe

[57] ABSTRACT

A timing signal generator for recovering timing signals in scrambled video signals in which the synchronizing signals are suppressed includes a tuned detector responsive to the color burst signal contained in the back porch of the suppressed horizontal blanking pulse. The vertical interval is detected as the absence of color burst for a specified time interval, and horizontal sync information is obtained by the detection of the first color burst after an absence of color burst.

7 Claims, 4 Drawing Figures

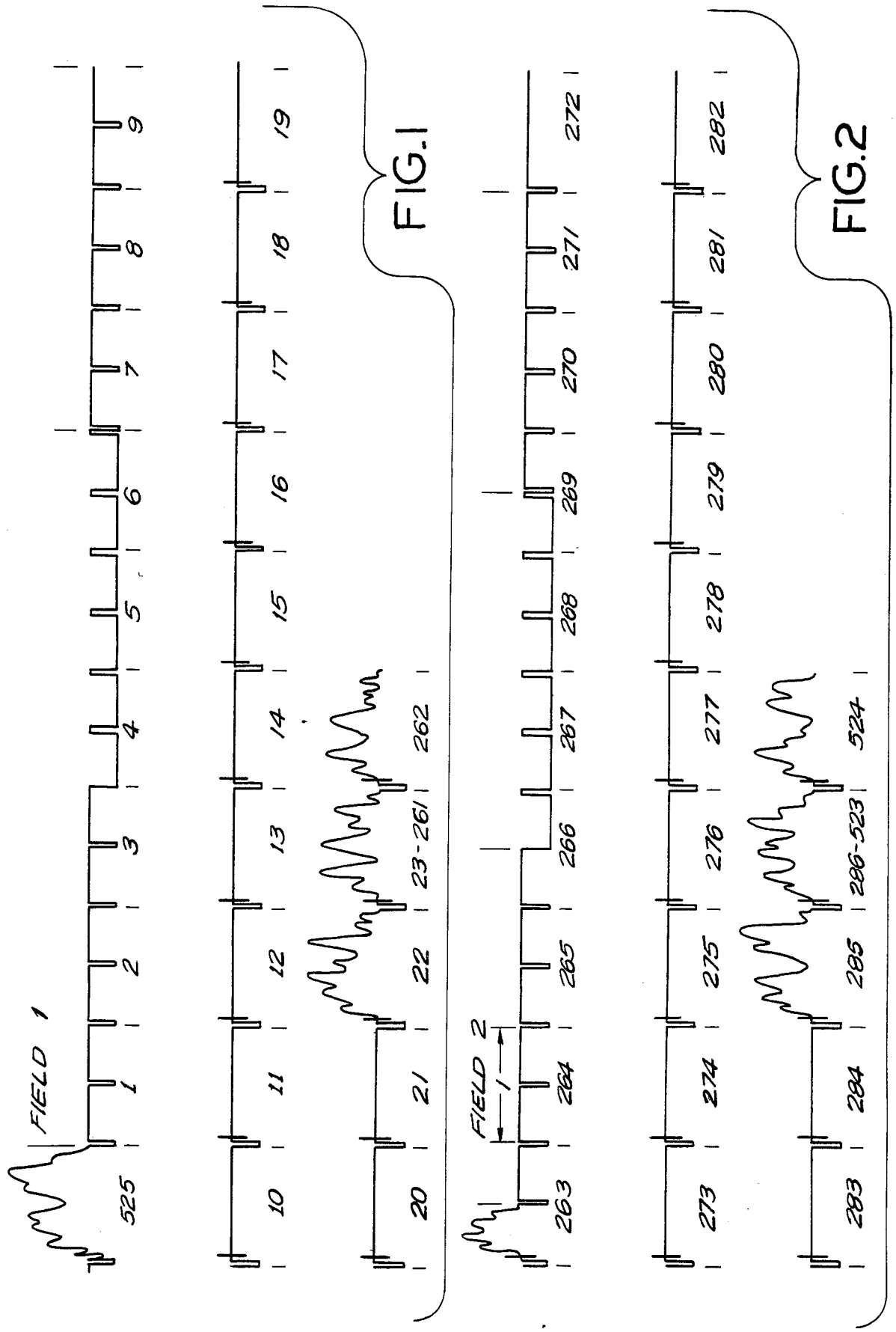

TIMING GENERATOR FOR SYNC SUPPRESSED TELEVISION SIGNALS

The present invention relates generally to television communication, and, more particularly, to an improved technique for recovering timing signals from a scrambled video signal.

The economic viability of subscription or pay television is dependent on the ability of the transmitter to encode or scramble a television signal so that an unauthorized receiver, that is, one not equipped with a suitable descrambler, will not be able to receive a viewable television picture. Over the years many techniques have been devised to scramble and then descramble a television signal for this purpose as shown, for example, in U.S. Pat. No. 4,222,068.

One common technique that has been employed to scramble a video signal is to suppress the horizontal synchronization pulses below the average value of the video level. This causes the television receiver to attempt unsuccessfully to lock horizontally on random video peaks rather than on the horizontal synchronizing pulses. The loss of effective horizontal synchronizing pulses also prevents the receiver from properly utilizing the color burst signal associated with the horizontal synchronizing pulse so that the color reproduction is also faulty.

In order for the receiver to be able to view the scrambled video signal, the suppressed synchronizing pulses must be recovered from the received video signal at the television receiver. Two techniques are commonly employed to allow the receiver to recover the suppressed sync and timing information. In one technique, a timing pulse is amplitude-modulated on the f.m. audio carrier, which is then detected in the audio portion of the receiver and used to generate the timing signals necessary to descramble the input scrambled video signal. In another known technique, some portion of the sync timing pulses, such as the vertical interval, is transmitted without suppression, that is, "in the clear". At the receiver the video portion phase locks to the clear or unsuppressed sync portion, thereby to create the required synchronizing and timing information.

Both of these known techniques have one flaw in common in that in both the timing signals can be recovered with relative ease so that in each the scrambling can be overcome by a relatively simple modification at the receiver to foil the scrambling and allow the video signal to be viewed without payment of the subscription fees. The first-described technique also creates possible interference problems with adjacent channels and can degrade the video signal or the channel being viewed. The latter technique has the further disadvantage of requiring the transmission of a relatively high amount of power during the unsuppressed "in-the-clear" intervals.

It is accordingly an object of the present invention to provide a technique for recovering timing information from a scrambled video signal in a manner which is difficult to foil.

It is a further object of the present invention to provide a timing generator of the type described which, when used in a CATV system, reduces the power requirement by permitting more power to be concentrated in the video signal and not in the synchronizing pulses.

It is another object of the present invention to provide a timing signal generator for use in descrambling a sync-suppressed scrambled video signal without the need to add additional timing information to the signal or to leave any portion of the sync pulses in the clear.

In the timing generator of the present invention a tuned detector detects the presence of the color burst signal after a prior absence of color burst of a predetermined duration. The vertical interval is detected as the absence of color burst for a predetermined time interval, whereas horizontal sync information is detected by noting the first color burst after vertical interval.

Figure 4:
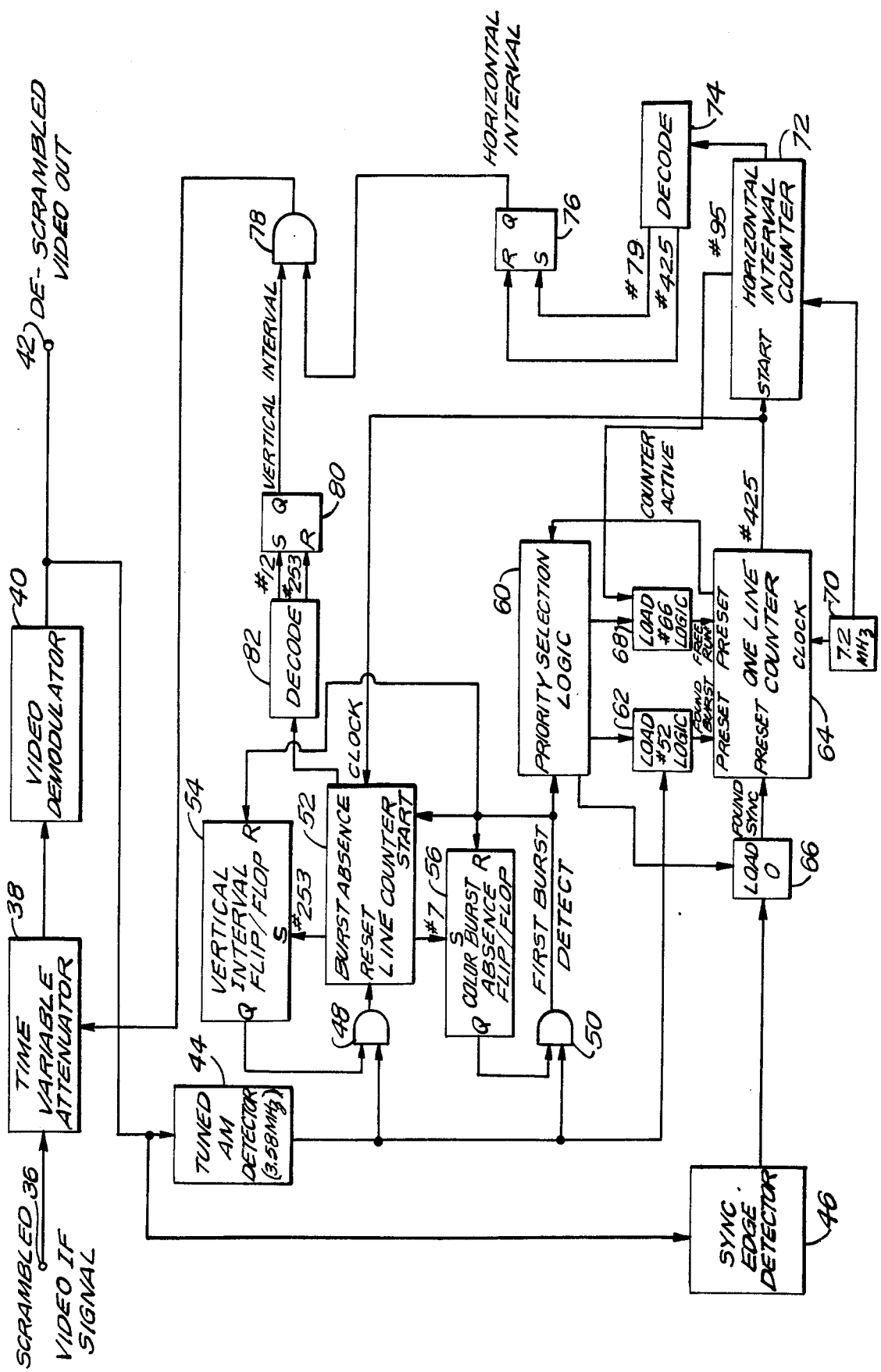

To the accomplishment of the above and such further objects as may hereinafter appear, the present invention relates to a timing generator for sync-suppressed television signals, substantially as defined in the appended claims and as described in the following specification as considered together with the accompanying drawings, in which:

FIGS. 1 and 2 are typical waveforms of field 1 and field 2 video signals for use in describing the operation of the present invention;

FIG. 3 is a block diagram of a video scrambler for producing a sync-suppressed scrambled video signal; and FIG. 4 is a schematic block diagram of a timing generator and descrambler in accordance with the present invention.

Referring to the drawings, FIGS. 1 and 2 respectively illustrate fields 1 and 2 of a typical NTSC television signal. As shown in FIG. 1, field 1 starts after line 525 and includes a horizontal interval followed by video. The horizontal blanking interval includes a front porch, and a horizontal signal pulse followed by a back porch, which carries on it a color burst signal typically at a frequency of 3.58 mHz. Lines 1 through 21 of field 1 constitute a vertical interval, which includes vertical synchronization information that typically includes equalizing pulses and vertical synchronizing pulses followed by additional equalizing pulses. The vertical synchronization information is typically followed by horizontal trace lines, which are separated by horizontal blanking pulses, which, as in the previous line 525, contain horizontal synchronizing pulses. Lines 22–262 of field 1 include horizontal blanking and synchronizing pulses and, of course, the video signals for each line.

As shown in FIG. 2, field 2 begins with a vertical interval between lines 263 through 284, the latter also including a half line of video, which is, in turn, followed by lines 285–524, which contain horizontal blanking and synchronizing signals and the video portion of each of these lines. When combined in an interlaced fashion, fields 1 and 2 constitute a single frame of a clear or unscrambled video signal.

The timing generator of the present invention descrambles a scrambled television signal in which the horizontal and vertical synchronizing information is suppressed below the level of video such that the receiver is unable to lock onto a synchronizing signal, thereby rendering the received image unviewable.

A circuit capable of scrambling an unscrambled video signal by suppressing the synchronizing signals is illustrated in FIG. 3. As therein shown the clear video signal is applied at a video input terminal 10 and then to the input of a modulator 12. The output of modulator 12 is connected to the input of a variable attenuator 14, which also receives an attenuation control signal that establishes the amount of attenuation to the modulated video signal caused by the attenuator 14. As described below, the control signal is caused to be high during the horizontal and vertical synchronizing intervals, but not during video, so that the output of the variable attenuator 14 is suppressed during those intervals and the output of the attenuator is a scrambled sync-suppressed video signal.

To this end, the clear or unscrambled video signal is applied to a sync stripper 16 in which the sync signal is stripped from the video and is applied to the inputs of a sync edge detector 18 and a half line detector 20. The latter detects the beginning of a vertical interval for each field and applies its output as a start signal to a divide-by-256 counter 22.

The output of the sync edge detector 18 is applied as the clock input to counter 22 as well as to the clock input of a divide-by-32 counter 24. The latter also receives the output of counter 22 as its start input. The output of counter 24 is applied to a decoder 26, which provides an output pulse corresponding to the vertical interval or lines 1–21 of field 1 and lines 263 through 284 of field 2.

The output of sync edge detector 18 is also applied to the start input of a divide-by-900 counter 28, which also receives clock signals at a rate of 14.3 mHz. The output of counter 28 is decoded in a decoder 30, which, produces a horizontal interval pulse. The latter along with the vertical interval pulse produced by decoder 26 are applied to the inputs of an OR gate 32, the output of which is high during only the horizontal and vertical intervals, and constitutes the attenuation control signal applied to the control input of variable attenuator 14. The output of attenuator 14 is thus, as noted previously, a scrambled video signal in which the levels of the horizontal and vertical synchronizing signals are suppressed. In the event of the transmission of a black-and-white signal, a simulated color burst signal may be added to the scrambled video output signal by suitable circuitry not shown in FIG. 3.

That scrambled video signal may be descrambled in the descrambler circuit of the invention, an embodiment of which is illustrated schematically in FIG. 4. Broadly described the circuit of FIG. 4 recovers the vertical and horizontal timing signals based respectively on the detection of the absence of color burst and then the occurrence of color burst after its absence for a predetermined interval or number of lines.

The scrambled sync-suppressed video signal is applied to the descrambler circuit of FIG. 4 at a scrambled video input terminal 36, which is connected to the input of a variable attenuator 38. The latter also receives an attenuation control signal, which, when low, causes attenuator 38 to produce less attenuation to the input scrambled video signal during the vertical and horizontal intervals, as compared to when the attenuation control signal is high. As will be appreciated, the descrambling operation of attenuator 38 in the descrambling circuit of FIG. 4 is opposite to the scrambling operation carried out in the variable attenuator 14 in the scrambling circuit of FIG. 3. The descrambled video is applied to a video demodulator 40, which removes the rf carrier and supplies a descrambled video baseband signal to the video output terminal 42.

The attenuation control signal applied to the variable attenuator 38 and which is low during the horizontal and vertical intervals is produced by the remainder of the timing generator circuit FIG. 4. First, however, referring to FIG. 1, it will be noted that color burst is not present in lines 1–9 of field 1, for example, and reoccurs at line 10. Thus, the detection of color burst following the absence of color burst for a certain interval identifies the occurrence of a vertical interval, which is then employed to develop the horizontal and vertical interval pulses. To this end, the demodulated video output of video demodulator 40 is applied to a detector 44 tuned to the frequency of the color burst, 3.58 mHz, as well as to the input of a sync edge detector 46. The output of color burst detector 44 is applied to an input of an AND gate 48 and to a input of an AND gate 50.

The output of AND gate 48 is applied to the reset input of a burst absence/line counter 52. When counter 52 reaches a count of 253 it provides a signal to the S terminal of a vertical interval flip-flop 54, the Q terminal of which is connected to the second input of AND gate 48. When counter 52 reaches a count of 7 it applies a signal to the S terminal of color burst absence flip-flop 56, the Q terminal of which is applied to the second input of AND gate 50.

The output of AND gate 50, when present, represents the first burst detect signal, which is applied to the start terminal of counter 52, to the R terminals of flip-flops 54 and 56, and to an input of a priority selection logic 60. The output of color burst detector 44 is also appled to one input of a load count number (#) 52 circuit 62, which, when it receives a signal from priority selection logic 60, loads a count of 52 into a one-line counter 64, which receives 7.2 mHz clock pulses from a clock pulse generator 70.

The start input of one-line counter 64 is connected to the output of a load zero circuit 66, which receives inputs from the sync edge detector 46 and the priority selection logic 60. Counter 64 also receives an input from a load #66 logic circuit 68, which, in turn, also receives an input from priority selection logic 60. When counter 64 is counting, it supplies a counter active signal to priority selection logic 60. In addition, the #425 output of one-line counter 64 is applied to the start input of a horizontal interval counter 72, which also receives the 7.2 mHz clock pulses from clock pulse generator 70. The #95 output from counter 72 is applied as an input to load #66 logic 68, and the count #425 output of counter 64 is also applied as the clock input of burst absence/line counter 52.

The output of counter 72 is applied to a decoder 74 and the #79 and #425 count signals are respectively applied to the S and R inputs of a flip-flop 76. The output of flip-flop 76 is applied as one input of an AND gate 78. The other input to AND gate 78 is the output of a flip-flop 80, which respectively receives at its S and R terminals the #12 and #253 decoded outputs of a decoder 82, which, in turn, receives an output from the burst absence/line counter 52.

The low output of flip-flop 76 is the reconstituted horizontal interval whereas the low output of flip-flop 80 is the reconstituted vertical interval. The output of AND gate 78, which is applied to the variable attenuator 38 as the attenuation-control signal, is thus low during the horizontal and vertical intervals and high at other periods so that the input scrambled video is attenuated by a greater extent during the video portion than during the horizontal and vertical intervals, thereby to restore the suppressed sync intervals to their proper levels relative to the video. The resulting output of attenuator 38 is, as noted above, an unscrambled video signal, which is demodulated in demodulator 40 and applied to the output terminal 42.

The priority selection logic 60 establishes the priority of operation of the descrambler circuit of FIG. 4. Namely, when a sync pulse is detected at detector 46, the priority selection logic 60 causes load zero logic 66 to load a zero count into counter 66, and disables load #52 logic 62 and load #66 logic 68. A second level of priority is the detection of color burst in the absence of a sync pulse at which time priority selection logic 60 enables load #52 logic 62 and disables load zero logic 66 and load #66 logic 68, whereby a count of 52 is loaded into counter 64. In the absence of both sync and color burst, priority selection logic 60 enables only load #66 logic 68 to load a count of 66 into the counter 64, which continues then to free run until color burst or sync is detected. Although the details of priority selection circuit 60 are not specifically illustrated in FIG. 4, the design of a logic circuit that performs the specified functions is believed to be well within the skill of the average logic designer and is thus not further described.

Thus, when a scrambled video signal is received at terminal 36, and when neither sync nor color burst is detected, priority selection logic 60 causes load #66 logic 68 to load a count of 66 into counter 64 to preset that counter, which continues to free run until it receives a count of 425 at which time it starts counter 72 and provides a clock to counter 52. The latter counts the lines for which there is an absence of sync and color burst until, as shown, a line count of 7 is achieved, which is applied through burst absence detector 56 to gate 50.

At the next occurrence of a color burst following at least a 7-line absence of color burst, gate 50 provides a signal to first burst detector 58, which provides a burst detect signal to priority select logic 60, which then causes load #52 logic 62 preset counter 64 with a count of 52 to establish a count shortened by about 7.3 μs, which is equivalent to the time period between the falling output of the sync edge and the color burst, which when detected in the descrambler of the invention initiates the process of deriving the horizontal and vertical sync pulses. When the sync pulse levels are restored to their proper levels as a result of the operation of attenuator 38, they are detected by sync edge detector 46, which produces a found sync signal, which through load zero logic 66 presets counter 64 to zero, which then counts toward 425 until the next sync pulse is detected.

It will thus be appreciated that the descrambler circuit of the invention operates as a feedback loop to derive or recover previously suppressed sync timing information by the detection of color burst following the absence of color burst for a predetermined interval. The circuit of the invention thus permits recovery of a sync-suppressed signal without adding any other timing information to the sync-suppressed video signal and without transmitting any portion of the synchronizing signals "in the clear" or unsuppressed.

If desired, lines of both fields 1 and 2 may be used to transmit data signals which modulate a 3.58 mHz carrier. Those signals may be detected by the a.m. color burst detector 44, which is used to detect color burst as described above. This data may be used, for example, to establish authorization or programming codes at the subscriber terminals, which permit the subscriber to descramble certain programming for which he or she is authorized to view. Thus, it will be apparent that this and other modifications may be made to the specific embodiment of the invention described hereinabove, without necessarily departing from the spirit and scope of the invention.

What is claimed is:

1. A descrambling circuit for producing signals during the vertical and horizontal intervals of a sync-suppressed scrambled signal, said circuit comprising first means for detecting the absence of color burst for a preset duration, second means for detecting the occurrence of a color burst signal following the absence of color burst for said preset duration, and first and second logic means respectively operatively coupled to and responsive to the operation of said first and second detecting means for respectively generating a reconstructed vertical interval signal and a horizontal interval signal.

2. The descrambling circuit of claim 1, further comprising means connected to said first and second logic means for combining said vertical interval and horizontal interval signals.

3. The descrambling circuit of claim 2, in which said color burst occurrence detecting means include a line counter having a reset terminal and a detector tuned at the color burst frequency, the output of said detector being applied to the reset terminal of said line counter.

4. The descrambling circuit of claim 3, in which said second logic means comprises color burst absence detect means coupled to the output of said line counter, said preset duration being established by a predetermined number of lines counted in said line counter prior to being reset upon the detection of color burst.

5. The descrambling circuit of claim 4, further comprising means for detecting a sync edge in a descrambled video signal, and third logic means comprising a priority selection gate for determining whether sync or color burst is detected, a one-line counter, and means controlled by said priority select gate for loading said one line counter with one of three counts corresponding to the absence of both sync edge and color burst, the detection of sync edge, or the detection of color burst.

6. The descrambling circuit of claim 5, further comprising a variable attenuator coupled to said signal combining means for attenuating an input scrambled video signal to a lesser extent during said horizontal and vertical intervals as compared to other intervals of the video signal, and means connected to the output of said attenuator for demodulating said descrambled video signal, the output of said demodulating means being connected to said color burst detector and sync edge detector.

7. The descrambling circuit of claim 5, in which said second logic means comprises a horizontal interval counter having a start terminal connected to the output of said one-line counter, means connected to the output of said horizontal interval counter for decoding an initial and a final count signal for said horizontal interval, and a flip-flop having set and reset terminals respectively receiving said initial and final horizontal interval signals, the output of said flip-flop constituting said horizontal interval signal.

* * * * *